April 8, 1969  W. JUNKERMANN ET AL  3,437,559
CIRCULATING PUMP FOR AN INTEGRAL NUCLEAR REACTOR
Filed May 16, 1967
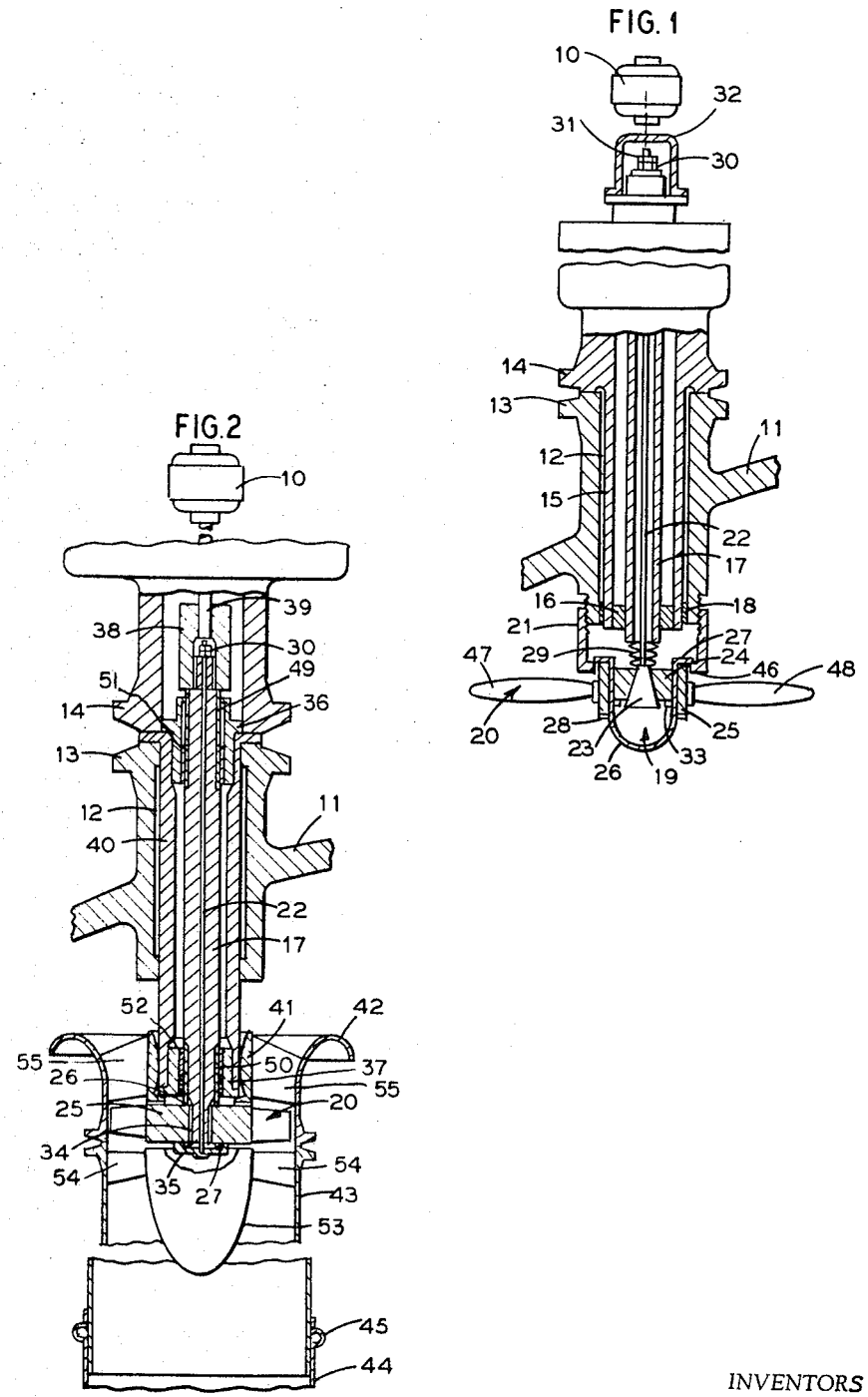
INVENTORS
Wolfgang Junkermann
Bruno Sachse
BY
ATTORNEY United States Patent Office 3,437,559
Patented Apr. 8, 1969

3,437,559
CIRCULATING PUMP FOR AN INTEGRAL
NUCLEAR REACTOR
Wolfgang Junkermann and Bruno Sachse, Oberhausen,
Rhineland, Germany, assignors to Babcock & Wilcox,
Limited, London, England, a corporation of Great
Britain
Filed May 16, 1967, Ser. No. 638,939
Claims priority, application Germany, May 17, 1966,
D 50,142
Int. Cl. G21d 1/04; G21c 13/00; F04d 3/02
U.S. Cl. 176—87       5 Claims

ABSTRACT OF THE DISCLOSURE

A circulating pump connected to a nuclear reactor pressure vessel and having an impeller wheel which is detachable from the drive shaft. A clamping device adjustable from a position external of the pressure vessel is used to operatively engage the impeller wheel with the drive shaft. The clamping device employs frictional force to achieve the bond between the impeller and the shaft. An alternate arrangement shows a spline-tooth gear construction to engage the impeller and the shaft. The opening in the reactor pressure vessel being sized to allow passage of the shaft and its associated bearings.

---

The invention relates to a circulation pump for a nuclear reactor, and more particularly to a pressurized water reactor, in which the pump is attached to the reactor pressure vessel by means of a flanged nozzle.

The known integral nuclear reactor systems usually have the circulating pump for the cooling medium arranged either on the bottom, in the top closure head or in the sides of the steel pressure vessel surrounding the reactor core and the shielding. Based on the relatively large diameter of the impeller of these pumps, corresponding large openings in the pressure vessel are required, which in turn considerably reduce the strength of the vessel walls increasing the necessary thickness of the walls. The disadvantage is of importance, because the pressure vessel is further weakened by the large openings required for installing the internals such as reactor core, shielding and heat exchanger, and for the control rod penetration.

The problem, on which the invention is based, is to design a circulating pump for reactors, which requires only a small opening in the pressure vessel wall and yet permits removal of the drive shaft and associated bearings for inspection and repair without requiring an entry into the pressure vessel.

The invention solves the problem by providing a clamping device which is actuated by a lifting rod adjustable from outside the pressure vessel. Accordingly, the lifting rod extends through the center of the drive shaft and is adjusted to compress a set of plate springs which operatively engage the drive shaft with the hub of the impeller wheel. Frictional traction transmits the motive force from the drive shaft to the hub of the impeller wheel. When the occasion requires it, the lifting rod can be disengaged allowing removal of the drive shaft and associated bearings. An alternate arrangement calls for the use of meshing gear teeth to operatively engage the drive shaft with the hub of the impeller wheel. The lifting rod supports the impeller wheel in its operative position and provides a seal against water leakage. Disengagement and removal of the drive shaft and associated bearings follows the same procedure as for the principal embodiment.

In the drawing, the circulating pump of the present invention is illustrated as vertically installed through the top of a reactor vessel.

FIG. 1 is a sectional side view of the lower part of a circulation pump showing the clamping device in accordance with the invention.

FIG. 2 is a sectional side view of a circulation pump showing an alternate arrangement for the clamping device.

As can be seen from the drawing, in FIG. 1 the pressure vessel 11 is provided with a nozzle opening 12 which is defined by the internal diameter of a flanged nozzle 13. The flange of nozzle 13 is attached to flange 14 of a member which may support the circulation pump motor 10. The flange 14 is provided with a cylindrical extension 15, at the lower end of which a bearing 16 for a drive shaft 17 is located. The extension 15 is kept in its position in the nozzle opening 12 by a guide ring 18. The upper end of the shaft 17 is connected with a motor 10.

The lower end of shaft 17 comes into contact with plate springs 29 of the clamping device 19. The cap screw 21 is threaded onto the lower end of nozzle 13 and supports the cup-shaped box 26. When not in operation the impeller wheel hub 25 is held in place by retaining ring 28. Pump shaft 17 is hollow to accommodate the lifting rod 22 which actuates clamping device 19 to operatively connect pump impeller wheel 20 to the shaft 17.

The clamping device 19 consists of cone 23 which attaches to the lower end of lifting rod 22 and fits into the slotted expansion ring 24 through which it exerts a contact pressure on the impeller wheel hub 25. The rim of cup-shaped box 26 forms a flange 27 which overlaps flange 46 formed at the lower end of cap screw 21. The impeller wheel 20 includes blades 47 and 48, hub 25, cup-shaped box 26 and counter support ring 33. When not in operation the impeller wheel 20 is supported by flange 27 which rests on flange 46 of cap screw 21. The closed-end bottom of cup-shaped box 26 prevents any loose or broken parts of the clamping device 19 from dropping into the reactor system.

In accordance with the invention, the pump shaft 17 is lowered over the lifting rod 22 and through nozzle opening 12 where it comes into contact with plate spring 29. In order to operatively engage the drive shaft 17 with the pump impeller wheel 20, the lifting rod 22 with its attached cone 23 are caused to move upward by tightening adjusting nut 30 located near the top end of the lifting rod. The upward movement of cone 23 causes the slotted expansion ring 24 to expand and exert a compressive force against a portion of the cup-shaped box 26 and the hub 25 of impeller wheel 20. A further tightening of adjusting nut 30 causes the impeller wheel 20 to move upward while at the same time compressing plate spring 29. In operative position, the plate spring 29 is fully compressed and the pump impeller wheel 20 has been lifted so that it is free of contact with cap screw 21. Locking nut 31 is used to prevent loosening of adjusting nut 30. The flanged cap 32 serves as a water tight closure over the drive shaft 17. Drive shaft 17 motive force is transmitted to impeller wheel 20 by frictional bonds formed between the lower end of drive shaft 17 and the upper end of plate spring 29, between the lower end of plate spring 29 and the upper end of slotted expansion ring 24, between the sides of slotted expansion ring 24 and the inner sides of cup-shaped box 26 and between the outer sides of cup-shaped box 26 and the inner sides of impeller wheel hub 25.

In order to remove the drive shaft 17 and associated bearing 6 from the pressure vessel 11 for inspection or repair, it is necessary to disengage the drive shaft 17 from impeller wheel 20. This is accomplished by removing locking nut 31 and adjusting nut 30 thereby releasing the pressure on plate spring 29 and allowing it to force the slotted expansion ring 24 back to its inoperative position. A tap on the lifting rod 22 will disengage cone 23 from the expansion ring and break all frictional bond between drive shaft 17 and pump impeller wheel 20.

FIG. 2 illustrates an alternate arrangement showing a pressure vessel 11 provided with a nozzle opening 12 which is defined by the internal diameter of flanged nozzle 13. The flange of cylindrical extension sleeve 40 is interposed between flange nozzle 13 and flange 14. Flange 14 is part of a member which may support the circulation pump motor 10. The lower end of extension sleeve 40 serves as a guide for the spherical shaped inner ring 41 of intake section 42. Intake section 42 attaches to outlet pipe 43 which connects to the steam generating section 44 by way of a slidable joint 45. Expansion differences between the extension sleeve 40 and the steam generating section 44 will be taken-up by spherical ring 41 and slidable joint 45. The end portions of extension sleeve 40 have their inner periphery recessed to accommodate bearings 36 and 37. The upper end of drive shaft 17 is fitted with a sleeve bushing 49 and its lower end with a sleeve bushing 50. Bushings 49 and 50 are in contact with bushings 51 and 52 of bearings 36 and 37. A cup-shaped box 53 is located below wheel hub 25 to prevent loose or broken parts from dropping into the reactor system. Struts 54 supportingly attach box 53 to outlet pipe 43 and struts 55 supportingly attached spherical ring 41 to intake section 42.

In accordance with the invention, the drive shaft 17 is connected with pump impeller wheel 20 by means of a spline toothed gear construction 34. In order to operatively engage the drive shaft 17 with the impeller wheel 20, the lifting rod 22 and its attached support washer 35 are caused to move upward by tightening adjusting nut 30 located near the top end of lifting rod 22. The upward movement of support washer 35 lifts impeller wheel hub 25 against gasket 26 resting on the shoulder of drive shaft 17 and inter-meshes the gear teeth of hub 25 with those on drive shaft 17. The gaskets 26 and 27 form a water tight seal for the cavities of the impeller hub 25 and the drive shaft 17. Motor shaft stub 39 connects to pump drive shaft 17 by means of a socket coupling 38.

What is claimed is:

1. A circulating pump for a nuclear reactor pressure vessel, means including a nozzle integral with a wall of said vessel defining an opening therethrough, a shaft extending through said opening, said shaft being hollow, a rod extending through said shaft, means for rotating the shaft from a position external of said pressure vessel, a pump impeller positioned adjacent the end of said shaft within said pressure vessel, and a clamping device, said rod being operatively associated with said clamping device for engaging said pump impeller to the shaft, the clamping device being operated by said rod from a position external of said pressure vessel.

2. A circulating pump for a nuclear reactor pressure vessel according to claim 1 wherein said clamping device includes a cone attached to said rod, an expansion ring associated with said impeller and arranged to receive said cone, and a plate spring located between that shaft and said expansion ring.

3. A circulating pump for a nuclear reactor pressure vessel according to claim 2 wherein a cap is attached to the lower end of said nozzle, and said pump impeller includes a cup-type box, said cap and said cup-type box forming a support for the pump impeller when said impeller is disengaged from said shaft.

4. A circulating pump for a nuclear reactor pressure vessel according to claim 1 wherein said pump impeller is engaged to said shaft by means of a spline-tooth gear construction.

5. A circulating pump for a nuclear reactor pressure vessel according to claim 4 wherein a support washer is attached to the lower end of said rod to form a support for the pump impeller when said impeller is disengaged from said shaft.

References Cited

UNITED STATES PATENTS 2,626,086   1/1953   Forrest _____ 222—385
2,896,544   7/1959   Ogles et al. _____ 103—89

REUBEN, EPSTEIN, *Primary Examiner.*

U.S. Cl. X.R.

176—50, 64; 103—89; 230—120; 222—385